United States Patent [19]

Tawarada et al.

[11] 3,877,884

[45] Apr. 15, 1975

[54] DISPERSION STRENGTHENED ALUMINUM BEARING MATERIAL

[75] Inventors: Takeshi Tawarada, Fuji; Shigeru Okaniwa, Kanbaramachi; Katsuo Nagahashi, Fuji, all of Japan

[73] Assignee: Nippon Light Metal Research Laboratory Ltd., Tokyo, Toyo Kogyo Co., Ltd., Hiroshima, both of Japan

[22] Filed: Oct. 30, 1972

[21] Appl. No.: 301,845

[30] Foreign Application Priority Data

Oct. 29, 1971 Japan.................................. 46-85602

[52] U.S. Cl. ............. 29/182.5; 29/182.7; 29/182.8; 75/135; 75/138
[51] Int. Cl........................... C22c 21/00; B22f 3/00
[58] Field of Search ............. 75/138, 135; 29/182.5, 29/182.7, 182.8

[56] References Cited

UNITED STATES PATENTS

| | | | |
|---|---|---|---|
| 2,568,157 | 9/1951 | Lepp | 29/182.5 X |
| 2,793,949 | 5/1957 | Fmich | 75/135 |
| 2,894,319 | 7/1959 | Thomson | 29/182.5 |
| 3,239,319 | 3/1966 | Pollard | 29/183 |
| 3,700,163 | 8/1971 | Baclia | 75/135 |
| 3,725,015 | 4/1973 | Weaver | 29/182.7 X |

Primary Examiner—C. Lovell
Assistant Examiner—Arthur J. Steiner
Attorney, Agent, or Firm—William J. Daniel

[57] ABSTRACT

An aluminum-based composite comprising an aluminum or aluminum-alloy matrix and finely divided particles of an inorganic wear-resistant material, i.e., ceramic, dispersed in the matrix, such particles consisting of a mixture of coarse particles of about $20\mu$ to $100\mu$ in diameter and fine particles of about $0.5\mu$ to $9\mu$ in diameter in a ratio of 1.5–4:1 in volume and exceeding 50% of the total volume of the composite.

2 Claims, No Drawings

DISPERSION STRENGTHENED ALUMINUM BEARING MATERIAL

FIELD OF THE INVENTION

The present invention relates to a composite of aluminum and wear-resistant non-metallic particles suitable for use in forming machine parts, particularly as a bearing material adapted for sliding contact with hard surfaces at high temperatures.

BACKGROUND AND GENERAL DESCRIPTION OF THE INVENTION

Composites of metal with wear-resistant inorganic particles, such as the hard metal oxides, carbides, and the like have been used for constructing machine parts expected to be subjected to high temperatures under operating conditions and particularly as a bearing material required to make sliding contact with hard surfaces, such as hard plating surface, or as flame spray surface coating for ceramic structures, because of the hardness, abrasion-resistance, and other desirable properties that are possible by the combination of the toughness inherent in metals and wear- and heat-resistance inherent in various inorganic ceramic and refractory compounds.

In general, the base metal employed in composites of the type in question in the past has a relatively high melting point, such as iron, nickel, chromium, copper, etc. In view of its outstanding thermal conductivity, electric conductivity, lightness, and other properties, aluminum would offer definite advantages as the base metal for such composites intended for use as bearing materials for parts in sliding contact, such as pistons in internal combustion engines and electrical contact points, which are exposed to high temperatures of 300° to 500°C.

However, since aluminum has a lower melting point than these generally used metals, the danger has been feared that composite bearing materials based on aluminum would be seriously subject to seizure under high temperature operating conditions because of superficial melting of the aluminum matrix. It has been found, according to the invention, that by incorporating in the aluminum matrix a sufficient amount of the wear-resistant inorganic material in excess of 50% of the total volume of the composite, the likelihood of seizure occurring under the usual operating conditions is much reduced, if not largely prevented.

With this high a volume ratio of particulate to matrix matter, the composites of the invention have the particles existing therein in a densely dispersed condition, in contrast to typical prior art composites, especially those of the so-called sintered metal type which are usually characterized by a more or less porous state. Consequently, the techniques for producing the present composites tend to differ from ordinary sintering.

Thus, the composites of the invention may be prepared by filling the wear-resistant material powder in a mold and subsequently injecting under a certain pressure molten aluminum or molten aluminum alloy and solidifying the contents of the mold under as high pressure, ranging from several hundred to several thousand atmospheres of pressure. Alternatively, the matrix metal can be melted in situ by heating a mixture of aluminum or aluminum alloy powder and a sufficient amount of wear-resistant material powder in a mold to a temperature sufficient to melt the metal powder, followed by solidification under high pressure as before. Hence, the present composites have a dense coherent continuous matrix of aluminum or aluminum alloy.

The most significant properties for the composite to be used as a bearing material are strength, particularly flexural strength, and abrasion resistance. Through detailed studies on the effect of particle size distribution on flexural strength and abrasion resistance of the aluminum-based composite obtained by the high pressure sintering method described above, it has been found that relatively coarse particles contribute to improvement of abrasion resistance so that coarse particles larger than 20μ should be contained in a sufficient quantity to achieve the improvement of abrasion resistance of the composite. On the other hand, coarse particles alone give very poor flexural strength and the addition of fine particles in the order of a few microns in a proper quantity is essential for the achievement of adequate flexural strength.

It is an object of this invention to provide a composite of an aluminum-based matrix containing finely divided wear-resistant inorganic material distributed therethrough, wherein the finely divided inorganic material constitutes more than 50 vol % of the composite and is formed of a mixture of coarse particles from about 20μ to 100μ in diameter and fine particles from about 0.5μ to 9μ in diameter at a ratio of about 1.5–4:1.

The composites according to this invention are characterized by outstanding flexural strength and abrasion resistance when used as a bearing material, due to the following reasons.

Coarse particles larger than 20μ accounting for more than a half of the wear-resistant powder contained in the composite firmly bond to the aluminum-based matrix to impart stiffness and abrasion resistance to the composite. Fine particles smaller than 9μ contained in the composite in a lesser quantity improve the heat resistance and strength of the aluminum base, impart high flexural strength to the composite, and prevent the seizure of the aluminum-based matrix on the bearing surface. The use of coarse particles larger than 100μ in diameter or the addition of coarse particles in excess of the ratio of about 1.5–4:1 of coarse particles to fine particles causes a considerable decrease in flexural strength of the composite, while the use of fine particles smaller than 0.5μ or the addition of fine particles in excess of the above ratio causes a considerable decrease in abrasion resistance of the composite. Where the content of powder in the composite is less than 50 vol % of the total volume of the composite, aluminum tends to seize on the bearing surface when subjected to high speed contact.

It is almost inevitable that some particles beyond the limit of the above-mentioned particle size ranges will be present or even produced in situ during compounding of coarse and fine particles. These deviations may be permitted provided the quantity of outside particles does not exceed several per cent and the effect of this invention is not seriously impaired.

EXPERIMENTAL BASIS OF THE INVENTION

The improvement of the present invention is illustrated by the following experimental data.

Table 1 shows the effect of variation in the volume ratio of coarse particles (30μ in diameter) to fine particles (2μ in diameter) on the flexural strength and abrasion resistance of the resulting composite. Table 2 shows the effect of variation in the diameters of both types of particles on the flexural strength and abrasion resistance of the resulting composite while the volume ratio of coarse particles to fine particles is kept constant at 3:1.

TABLE 1

| Ratio (Coarse/Fine) | Flexural Strength (Kg/mm$^2$) | Abrasion (mm$^3$) |
| --- | --- | --- |
| 6:1     | 31.5 | 0.41 |
| 4:1 *   | 46.2 | 0.41 |
| 3:1 *   | 63.0 | 0.45 |
| 2:1 *   | 62.7 | 0.48 |
| 1.5:1 * | 64.1 | 0.63 |
| 1:1     | 66.1 | 1.85 |
| 0.5:1   | 72.5 | 4.22 |

* designates a composite within the scope of this invention.

TABLE 2

| Diameter of Coarse Particles ($\mu$) | Diameter of Fine Particles ($\mu$) | Flexural Strength (Kg/mm$^2$) | Abrasion (mm$^3$) |
| --- | --- | --- | --- |
| 125    | 3   | 32.2 | 0.24 |
| 100 *  | 3   | 46.5 | 0.27 |
| 75 *   | 3   | 55.6 | 0.26 |
| 50 *   | 3   | 63.3 | 0.31 |
| 25 *   | 3   | 64.3 | 0.42 |
| 15     | 3   | 64.1 | 0.76 |
| 30     | 10  | 38.5 | 0.31 |
| 30 *   | 5   | 59.1 | 0.28 |
| 30 *   | 1   | 63.5 | 0.37 |
| 30 *   | 0.5 | 64.3 | 0.48 |
| 30     | 0.1 | 69.0 | 1.75 |

* designates a composite within the scope of this invention.

In these experiments cast aluminum alloy AC7A (Mg: 4.5%; balance: aluminum) was used as a base alloy, and alumina powder was used as dispersed particles. The specimen composites were prepared in the following manner. The alumina powder mixed to the prescribed proportions of coarse to fine particles was preheated to 700°C and then packed into a cylindrical mold, 30 mm in diameter and 160 mm high, up to a height of 60 mm. Subsequently, molten aluminum alloy was poured into the mold up to a height of 45 mm, and 100-atm. pressure was applied by means of a pressing ram so that the molten alloy was forced into spaces between particles. The molten alloy was allowed to solidify under a pressure of 400 atm. Thus, composites containing 52 to 56 vol % of powder were obtained. The flexural strength was measured by the common method wherein a load is applied to the center of a specimen bar supported at its ends. The abrasion resistance was measured by means of an abrasion tester of turn-table type wherein water-proof polish paper with No. 400 silicon carbide is pasted onto the turn table and abrasion is performed with a vertical load of 3 Kg/cm$^2$ on the composite specimen at a speed of 5 m/sec for 1.5 hours in a wet condition, the loss in thickness being measured in mm so that high values indicate inferior performance.

As can be seen in Table 1, as the ratio of coarse particles to fine particles exceeds 4 (which is the upper limit of the range permitted in the invention), the flexural strength of the composite decreases rapidly, while, as the ratio becomes smaller than 1.5, the abrasion resistance of the composite decreases substantially. Table 2 shows that the use of coarse and fine particles larger in diameter than the range established for the invention decreases considerably the flexural strength of the composite, and that the use of coarse and fine particles smaller in diameter than the range permitted in the invention decreases the abrasion resistance.

MATERIALS OF THE INVENTION

In addition to aluminum itself, any of the usual alloys of aluminum will serve as the matrix material of the invention. A variety of such alloys are available and generally contain a minor proportion, ordinarily up to a total of about 10% by weight of one or more additional constituents, including magnesium, manganese, chromium, silicon and copper. The selection of a particular alloy will be primarily determined by the needs of the particular utility to be met.

As the wear-resistant inorganic particulate material, considerably wider latitude is available. In this case, mention may be made of the various oxides, i.e., aluminum oxide (alumina), silicon dioxide, magnesium oxide, titanium dioxide, chromium oxide, zirconium dioxide, berillium oxide, calcium oxide, etc., and the various natural or synthetic minerals containing mixtures of these in differing proportions. Most of these materials are commonly used as refractory materials and are hence valuable in imparting heat resistance to the present composites. Also of importance are the carbides, i.e., silicon carbide, boron carbide, titanium carbide, cobalt carbide, tantalium carbide, zirconium carbide, tungsten carbide and so on, whether of synthetic or natural origin. To this list should be added the newer more exotic "space-age" materials including the nitrides, i.e., boron nitride, titanium nitride, silicon nitride, etc., the borides, the silicides, the "cermets" and intermetallic compounds of comparable properties. Although many of the potentially useful materials for this component are not produced from earthy or clay materials and, consequently, might not be comprehended by the term "ceramic" in this strict sense, this term is typically used in the art in a much broader sense and will be employed here to generically denote this aspect of this invention, for want of more apt and definite nomenclature in this field. Of course, some of these materials may be better for some purposes than others; the skilled worker, however, will have no difficulties in matching the ceramic to the use.

If desired, minor amounts of other ingredients may be added to the composites of the invention, following the practice of the art.

SPECIFIC EXAMPLES OF THE INVENTION

The present invention will be illustrated by the following examples.

EXAMPLE 1

An aluminum-ceramic composite containing 65 vol % of ceramic powder was obtained by preheating silicon carbide powder containing coarse particles (60$\mu$ in diameter) and fine particles (4$\mu$ in diameter) at a ratio of 3:1, to 750°C, filling this powder in a pressurecasting mold (30 mm × 160 mm) up to 80 mm high and injecting molten aluminum (99.0%) up to 60 mm high, under a pressure of 100 atm. to allow infiltration of the molten aluminum into the powder, followed by solidification of the molten aluminum under a pressure of 600 atm.

For the purpose of comparison, aluminum-ceramic composites were prepared using coarse silicon carbide powder alone and fine silicon carbide powder alone.

The flexural strength and abrasion resistance of these composites measured by the same methods as described above are shown in the following Table 3.

Table 3

| SiC Powder Used | Flexural Strength (Kg/mm$^2$) | Volume of Abrasion (mm$^3$) | Remarks |
| --- | --- | --- | --- |
| Mixed Powder | 68 | 0.28 | Composite according to the invention |
| Coarse Powder Alone | 18 | 0.06 | Composite for comparison |
| Fine Powder Alone | 52 | 21.3 | Composite for comparison |

As will be seen from Table 3, the composites prepared with coarse particles alone or fine particles alone are inferior in both flexural strength or abrasion resistance, and lack satisfactory bearing characteristics. In contrast with this, it is apparent that the composite according to the invention containing a mixture of coarse particles and fine particles in a ratio of 3:1 is outstanding in both flexural strength and abrasion resistance.

EXAMPLE 2

An aluminum-ceramic composite containing 61 vol % of ceramic powder was produced in the same manner as in Example 1 by mixing coarse particles (40$\mu$ in diameter) and fine particles (2.5$\mu$ in diameter) of silicon nitride powder at a ratio of 3.5:1.

The flexural strength and abrasion resistance of the resulting composite are satisfactory as shown below.

| | |
| --- | --- |
| Flexural Strength: | 68.3 Kg/mm$^2$ |
| Abrasion | 0.36 mm$^3$. |

What is claimed is:

1. A light-weight wear-resistant composite material consisting essentially of a solid metallic matrix of aluminum or an aluminum-base alloy and dispersed in said matrix finely divided discrete particles of a non-metallic wear-resistant inorganic ceramic material, the amount of said inorganic particles being sufficient to occupy in excess of 50% of the total volume of the composite material, and the amount of said metal being sufficient to form a solid continuous phase, said particles being constituted by a generally uniform mixture of coarse particles having a diameter of about 20–100$\mu$ and fine particles having a diameter of about 0.5 to 9$\mu$ in a ratio by volume about 1.5–4:1.

2. The composite material of claim 1 wherein the volume ratio of coarse to fine particles is about 2–3:1.

* * * * *